Figure 1:
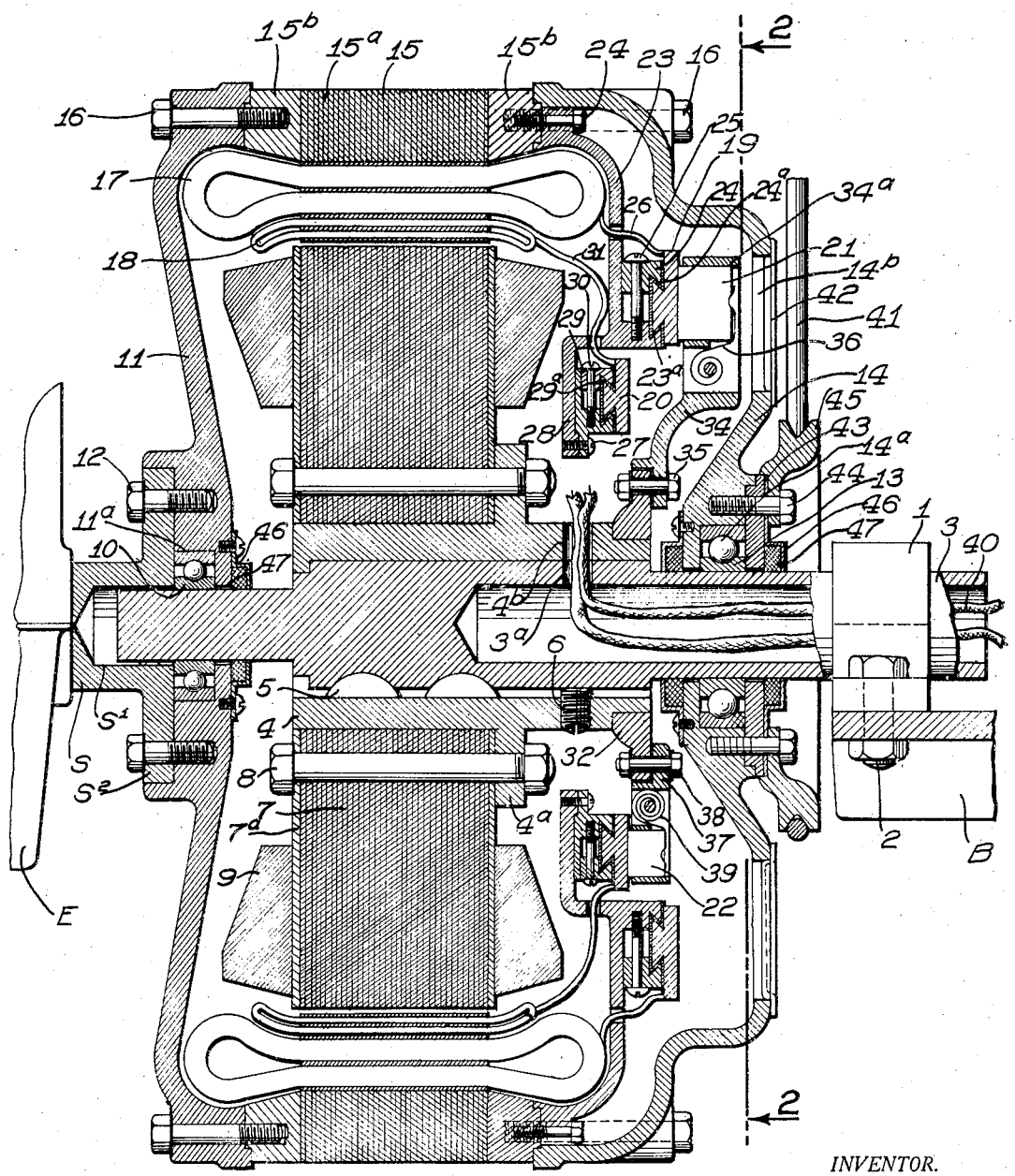

INVENTOR.
EATHELBERT W. WEATHERS
BY A.B.Bowman
ATTORNEY.

Patented May 19, 1931

1,805,935

UNITED STATES PATENT OFFICE

EATHELBERT W. WEATHERS, OF SAN DIEGO, CALIFORNIA

ELECTRIC MOTOR GENERATOR

Application filed November 2, 1926. Serial No. 145,723.

My invention relates to an electric motor generator, more particularly adapted for use in connection with motor vehicles.

The objects of my invention are: first, to provide a motor generator which is particularly simple and compact of construction and relatively light of weight; second, to provide a motor generator of this class which is proportionately small, strong, powerful and efficient for the great amount of power produced; third, to provide a wholly self-contained motor and generator for motor vehicles and other mechanisms; fourth, to provide a combined double generator and motor for simultaneously producing separate currents and also for serving as an electric motor; fifth, to provide a generator for producing electric current for driving the wheels of a vehicle, said generator serving as an effective dynamic brake, in combination with the mechanical power plant with which it is connected, for controlling the speed of the vehicle when and as desired; sixth, to provide a generator of this class which possesses unusual flexibility in generating currents of varying strengths or electromotive force; seventh, to provide a generator of this class, in combination with a prime mover or power plant such as an internal combustion engine, in which the armature revolves about the field, thus effectively serving as a flywheel for the engine or other prime mover; eighth, to provide an electric machine of this class, for generating current and for rotating the prime mover, in which the enclosing portion of the machine is directly connected with the revolving shaft of the prime mover; ninth, to provide an electric machine of this class which, though small, compact and of large capacity, may be and is effectively cooled by reason of the exposed and revolving armature of the machine; tenth, to provide an electric machine of this class, in combination with a power plant and a fixed support, which is provided with a shaft, the one end of which is non-rotatably fixed on the fixed support and extended into and mounted on the revoluble member of the power plant, the non-rotatably fixed shaft carrying the electric machine and alining the same with the power plant, thus providing a substantial, yet flexible connection between the electric machine and the power plant; eleventh, to provide an electric machine of this class in which the parts are readily accessible and which may be readily dismounted for repairs; twelfth, to provide a novel arrangement of commutators and brushes in a motor generator of this class, and thirteenth, to provide as a whole a novelly constructed motor generator, one which is economical of construction proportionate to its functions, and which will not readily deteriorate or get out of order.

Figure 2:
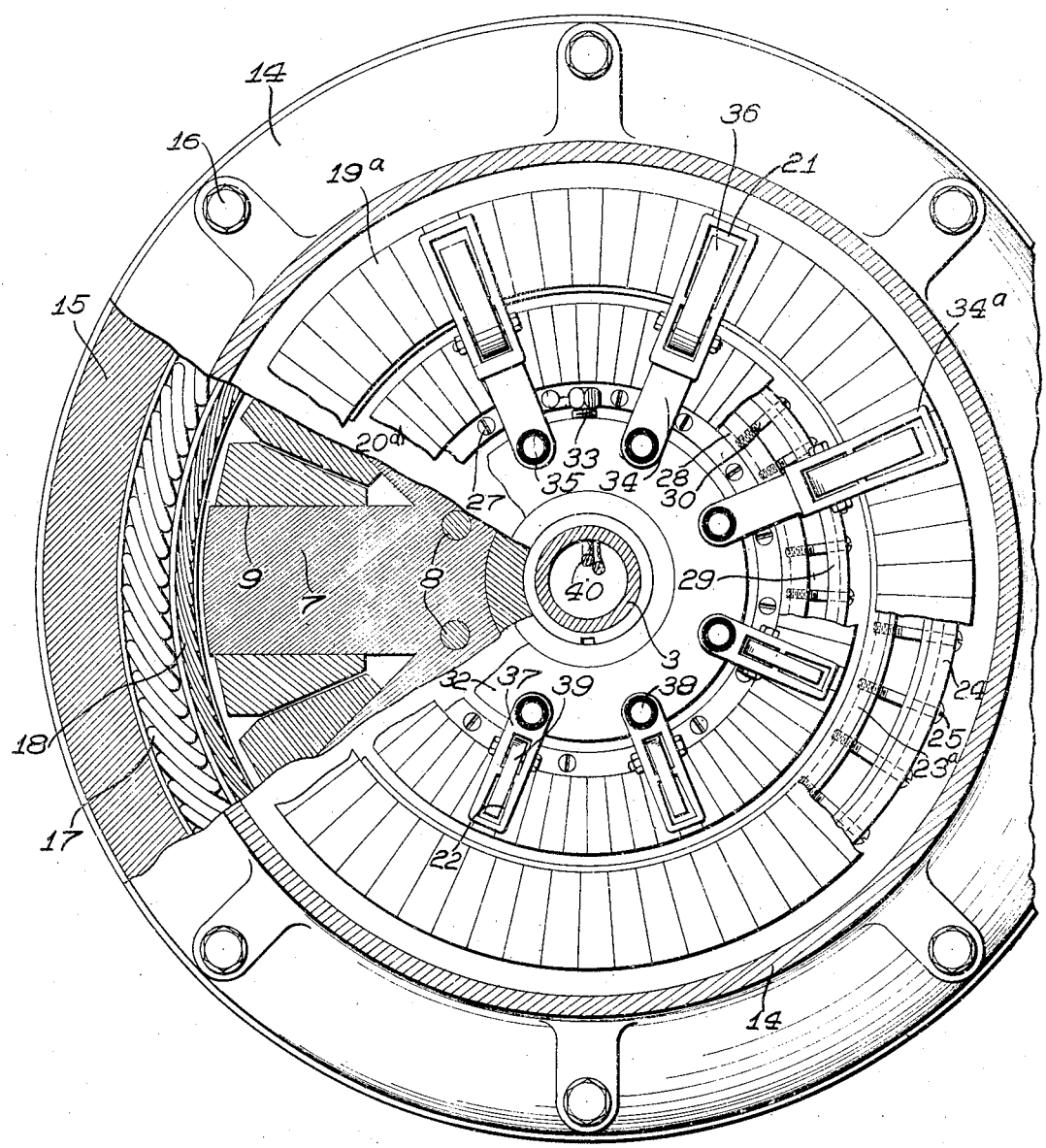

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a longitudinal sectional elevational view of my motor generator in its preferred form of construction, showing the same directly connected at one end with an internal combustion engine and mounted at its opposite end on a fixed support, the latter and the engine being shown fragmentarily, certain parts and portions of the motor generator being also shown in elevation to facilitate the illustration; and Fig. 2 is a partial sectional and partial elevational view thereof, taken at 2—2 of Fig. 1, certain parts and portions of certain brushes, brush holders, commutators and commutator supports being broken away to facilitate the illustration.

Like characters of reference refer to similar parts and portions throughout the several views of the drawings.

The prime motor or power plant for operating my motor generator for producing power is preferably an internal combustion engine as now employed on automotive vehicles, but the same may be of any other form of prime mover desired. The internal combustion engine is indicated by E and is only fragmentarily illustrated in the drawings. My motor generator is partially supported by the engine and partially by a frame or bracket, indicated by B, also fragmentarily illustrated.

On the bracket B is mounted a supporting clamp means or bracket 1 which is secured to the bracket B by means of bolts 2. In the means 1 is clamped the one end of the motor generator shaft 3, which is hollow at said end and hollow a considerable distance inwardly. The opposite end of the shaft 3 extends preferably into a recess S1 at the central portion of the end of the shaft S extending beyond the housing of the engine, as illustrated in Fig. 1. It will be seen that the shaft 3 provides a substantially cantilever support for the electric machine.

On and intermediate the ends of the shaft 3 is mounted the field core hub member 4, which is preferably keyed to the shaft by means of keys 5 and secured thereto by means of set screws 6. Said hub member is provided with a tubular portion on which are mounted iron field core laminations or plates 7, which are preferably provided at the outer sides of the outer laminations or plates with heavier plates 7a. The laminations and plates of the field core are secured to an outwardly extending flange 4a, intermediate the ends of the hub member, by means of bolts 8. The core is shaped into arms or poles of any desired number and shape. These arms form the cores for the field cores 9, which are wound therearound. At the free end of the shaft 3, and beyond the outer end of the motor shaft S, is mounted a ball-bearing 10, the outer race of which is mounted in an annular channel 11a at the outer side and near the axial portion of the end housing member or bracket 11. Said housing member is fixedly secured, by means of a plurality of cap screws 12, to a securing flange S2 at said outer end of the engine shaft S, as shown in Fig. 1. Thus the free end of the shaft 3 is freely rotatable relative to the engine shaft S.

Near the opposite end of the stationary shaft 3, that is, at the portion between the field core and the shaft securing means 1, is mounted another ballbearing 13, the inner race of which is secured to the shaft and the outer race of which is secured within an annular recess 14a at the outer side and axial portion of another end housing member or bracket 14.

The housing members 11 and 14 extend outwardly a considerable distance beyond the outer portions of the field core 7. The outer or peripheral portions of the housing members 11 and 14 are secured relative to each other by means of the annularly shaped armature 15, the former being secured to the latter by means of cap screws 16 extending through the side walls of the former. The armature 15 consists of laminated iron plates 15a, punched in annular form and positioned adjacent each other, and provided at the outer sides of the outer laminations, or plates, with retaining rings 15b which may be secured relative to each other by any suitable means. The aforementioned housing members or brackets are preferably secured directly to the rings 15b.

At the inner portions of the laminations or plates 15a are provided means, preferably in the form of slots extending from one side to the other, for supporting two sets of armature windings or coils 17 and 18, the former being considerably larger than the latter and positioned outwardly relative to the latter, as illustrated in the drawings.

The outer set of coils 17, together with the field coils 9, serves to generate an electric current of any predetermined potential when the armature is rotated by the engine. The inner set of coils or windings 18, together with the field coils 9, serves as a generator of electric current of preferably a relatively low E. M. F. for charging a storage battery of the vehicle, for supplying the ignition system of the engine with a current, for supplying current for the lighting system of the vehicle or any other auxiliary purpose. The coils 18 are also arranged and adapted to serve as a motor together with the field coils 9 for rotating the shaft S of the engine or other prime mover for starting purposes.

The housing member 14 is considerably enlarged and spaced a considerable distance from the core 7 and coils 9. In the space between the end housing member 14 and the field are positioned the commutators 19 and 20, the brushes 21 and 22, respectively engaging said commutators, and the respective sockets and associated members of said brushes. The commutators 19 and 20 are supported on an annular and substantially disc-shaped commutator supporting member 23, which is secured, by means of cap screws 24, to the adjacent side of one of the rings 15b of the armature core. Said supporting member extends around the coils or windings 17 and thence inwardly toward the axis of revolution. The supporting member 23 is offset at its middle portion toward the field core. In this offset portion is mounted the commutator 20, while the commutator 19 is positioned outwardly from the offset portion. The latter commutator, which consists of a plurality of commutator segments 19a provided at their back sides with dovetail lug portions, is mounted in a dovetail channel formed by a channel 23a, of acute angular cross-section and extending around the outer side of a circular ledge directed outwardly longitudinally from the main portion of the supporting member 23, and another circular channel 24a, of acute angular cross-section formed in the adjacent sides of a multiplicity of commutator segment retaining ring sections 24 positioned in opposed relation to said circular ledge. The retaining ring sections 24 are secured in position relative to the supporting member 23, for forming said dovetail channel, by means of a plurality of radially extending screws 25, as shown in Fig. 1. Said commutator segments are insulated from each other and from their respective supporting means in any suitable manner. The commutator segments 19a are connected with the coils 17 by leads 26, which extend through openings in the supporting member 23, as shown in Fig. 1.

To the inner portion of the offset portion of the supporting member 23 is secured, by means of screws 27, a commutator carrying ring 28, which is also provided at its peripheral portion with an annular channel, of acute angular cross-section, forming with similarly shaped but opposed channels 29a, at the inner sides of commutator segment retaining ring sections 29, a second annular dovetail channel for receiving and retaining dovetail lugs at the back sides of the segments 20a of the commutator 20. Said latter commutator segments are also insulated from each other and from the ring 28 and from the ring sections 29 by suitable insulation. The retaining ring sections 29 are secured to the carrying ring 28 by means of a plurality of radially extending screws 30. The commutator segments 20a are also connected, by means of leads 31, to the armature coils 18, said leads 31 also extending through the wall of the supporting member 23.

On the end of the hub member 4, opposite the engine, is mounted the brush socket supporting ring 32, which may be adjustably secured to said hub member by means of a set screw 33, shown in Fig. 2. To the edge at the upper side of the supporting ring are secured, by means of bolts 35, a plurality of brush sockets 34, said sockets and bolts being insulated from the ring 32. Said brush sockets radiate from the ring 32 at certain distances from each other depending upon the type of winding used. At the outer portions of the brush sockets 34 are provided sockets or recesses 34a, in which are reciprocally or adjustably mounted the brushes 21, which are automatically forced into engagement with the commutator segments 19a, by means of spiral springs 36 mounted on the socket members or arms 34, intermediate the ends of the latter. To the opposite side of the ring 32 are similarly secured, by means of bolts 38, a plurality of smaller brush sockets or holders 37. At the outer ends of said sockets or holders are also reciprocally or adjustably mounted the brushes 22, which are forced into engagement with the commutator segments 20a by means of the coil springs 39 mounted on the arms or holders 37.

The arms or holders 34 and 37 are connected with the cables 40, which extend outwardly through holes 4b in the hub members 4, and 3a, in the stationary shaft 3, from the interior or hollow end of said stationary shaft. Said cables may be directed from the hollow portion or end of the shaft to the source of energy, as desired. Said cables 40 are also connected with the field windings 9 in any suitable manner.

In the outer wall of the end housing member 14 are provided openings 14b to permit ready access to the brushes and brush holders, springs, commutators, or the like. Over said openings are secured the removable plates 41 by means of screws 42, as shown.

To the outer wall of the end housing member 14 at the hub portion thereof, and over the annular recess or channel 14a, is secured a ballbearing retaining plate 43 by means of bolts 44. To the outer side of the plate 43, and preferably by means of the bolts 44, is secured the auxiliary drive member 45 in the form of a sheave, pulley, gear, or the like. At the inner sides of the housing members 11 and 14 at the hub portions thereof, and also at the outer side of the plate 43 at the central portion thereof, are secured packing retaining rings or plates 46, in which is positioned packing 47 of any suitable nature for retaining lubrication in the space occupied by the ballbearings.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a mechanism of the class described, a fixed hollow shaft, a field core mounted on and intermediate the ends of said shaft, a pair of end housing members revolubly mounted on said shaft at the opposite sides of said core, an armature core secured between and to the outer portions of said housing members, the inner portion of said core being provided with coil supporting means, a set of commuted coils mounted on said means around the circumference thereof, and another set of commuted coils mounted on said means and positioned inwardly from said first mentioned coils and adjacent the peripheral portions of said field core.

2. In a mechanism of the class described, a fixed hollow shaft, a field core mounted on and intermediate the ends of said shaft, a pair of end housing members revolubly mounted on said shaft at the opposite sides of said core, an armature core secured between and to the outer portions of said housing members, the inner portion of said core being provided with coil supporting means, a set of coils mounted on said means around the circumference thereof, another set of coils mounted on said means and positioned inwardly from said first mentioned coils and adjacent the peripheral portions of said field core, and a pair of annular commutators positioned within the housing and supported by said armature to one side of said field core in concentric relation with each other, the engaging faces of said commutators being transverse with their axes of revolution.

3. In a mechanism of the class described, a fixed hollow shaft, a core mounted on and intermediate the ends of said shaft, a pair of end housing members revolubly mounted on said shaft at the opposite sides of said core, an armature core secured between and to the outer portions of said housing members, the inner portion of said core being provided with coil supporting means, a set of coils mounted on said means around the circumference thereof, another set of coils mounted on said means and positioned inwardly from said first mentioned coils and adjacent the peripheral portions of said field core, a pair of commutators positioned within the housing and supported at one side of the field core by said housing members, the faces of said commutators being transverse with their axes of revolution and positioned in concentric relation to each other, the segments of the outer commutator being connected with the one set of windings and the segments of the inner commutator being connected with the other set of windings, and a pair of sets of brushes, one set being positioned at one side of the axis of the motor generator in engagement with one commutator and the other set of brushes being positioned at the opposite side of the axis in engagement with the other commutator.

4. In a mechanism of the class described, the combination with a power plant having a revoluble member, of a supporting shaft relatively fixed at its one end and extended with its opposite end into the revoluble member of said power plant, a field core mounted intermediate the ends of said shaft, a housing revolubly mounted on said shaft at the opposite sides of said core and around the same, and an armature core carried by said housing contiguous to and around said field core.

5. In a mechanism of the class described, the combination with a power plant having a revoluble member, of a supporting shaft relatively fixed at its one end and extended with the opposite end into the revoluble member of said power plant, a field core mounted intermediate the ends of said shaft, a housing revolubly mounted on said shaft at the opposite sides of said core and around the same, and an armature core carried by said housing contiguous to and around said field core, said armature having two sets of windings, one set of windings serving to generate separate electric currents when said housing is rotated by the revoluble member of said power plant and the other set of windings serving to create a torque for rotating the revoluble member of said power plant for starting the latter.

6. In a mechanism of the class described, the combination with a power plant having a shaft provided with a flanged connecting end and a recess in said end, of a supporting shaft fixed against rotation at its one end and extended with its opposite end into the recess of the shaft of said power plant, a field core mounted on and intermediate the ends of said shaft, an end housing member revolubly mounted on said shaft near the one end thereof and secured to the flanged end of the shaft of said power plant, said housing member being positioned at one side of said field core and extended beyond the normal peripheral portion thereof, another housing member revolubly mounted on said shaft at the opposite side of said field core and between the latter and the fixed end of said stationary shaft and also extended outwardly beyond the peripheral portion of the core, and an armature core secured to and between the outer portions of said housing members around and contiguous to said field core.

7. In a mechanism of the class described, the combination with a power plant having a shaft provided with a flanged connecting end and a recess in said end, of a supporting shaft fixed against rotation at its one end and extended with its opposite end into the recess of the shaft of said power plant, a field core mounted on and intermediate the ends of said shaft, an end housing member revolubly mounted on said shaft near the one end thereof and secured to the flanged end of the shaft of said power plant, said housing member being positioned at one side of said field core and extended beyond the normal peripheral portion thereof, another housing member revolubly mounted on said shaft at the opposite side of said field core and between the latter and the fixed end of said stationary shaft and also extended outwardly beyond the peripheral portion of the core, an armature core secured to and between the outer portions of said housing members around and contiguous to said field core, said armature core being provided at its inner side with transverse grooves, and a pair of sets of armature coils, one set of coils being separate from and positioned inwardly from the other set of coils.

8. In a mechanism of the class described, the combination with a power plant having a shaft provided with a flanged connecting end and a recess in said end, of a supporting shaft fixed against rotation at its one end and extended with its opposite end into the recess of the shaft of said power plant, a field core mounted on and intermediate the ends of said shaft, an end housing member revolubly mounted on said shaft near the one end thereof and secured to the flanged end of the shaft of said power plant, said housing member being positioned at one side of said field core and extended beyond the normal peripheral portion thereof, another housing member revolubly mounted on said shaft at the opposite side of said field core and between the latter and the fixed end of said stationary shaft and also extended outwardly beyond the peripheral portion of the core, an armature core secured to and between the outer portions of said housing members around and contiguous to said field core, said armature core being provided at its inner side with transverse grooves, a pair of sets of armature coils, one set of coils being separate from and positioned inwardly from the other set of coils, and a pair of commutators positioned between said field core and said second housing member and supported by said armature core, said commutators being concentric and the engaging faces of said commutators being positioned transversely with the axis of revolution thereof.

9. In a mechanism of the class described, the combination with a power plant having a shaft provided with a flanged connecting end and a recess in said end, of a supporting shaft fixed against rotation at its one end and extended with its opposite end into the recess of the shaft of said power plant, a field core mounted on and intermediate the ends of said shaft, an end housing member revolubly mounted on said shaft near the one end thereof and secured to the flanged end of the shaft of said power plant, said housing member being positioned at one side of said field core and extended beyond the normal peripheral portion thereof, another housing member revolubly mounted on said shaft at the opposite side of said field core and between the latter and the fixed end of said stationary shaft and also extended outwardly beyond the peripheral portion of the core, an armature core secured to and between the outer portions of said housing members around and contiguous to said field core, said armature core being provided at its inner side with transverse grooves, a pair of sets of armature coils, one set of coils being separate from and positioned inwardly from the other set of coils, a pair of commutators positioned between said field core and said second housing member and supported by said armature core, said commutators being concentric and the engaging faces of said commutators being positioned transversely with the axis of revolution thereof, a brush support mounted on said supporting shaft and provided at the opposite sides of its axis with sets of brush sockets, and brushes reciprocally and removably mounted in said brush sockets, said brushes being removably positioned in engagement with said commutators.

10. In a mechanism of the class described, the combination with a power plant having a shaft provided with a flanged connecting end and a recess in said end, of a supporting shaft fixed against rotation at its one end and extended with its opposite end into the recess of the shaft of said power plant, a field core mounted on and intermediate the end of said shaft, an end housing member revolubly mounted on said shaft near the one end thereof and secured to the flanged end of the shaft of said power plant, said housing member being positioned at one side of said field core and extended beyond the normal peripheral portion thereof, another housing member revolubly mounted on said shaft at the opposite side of said field core and between the latter and the fixed end of said stationary shaft and also extended outwardly beyond the peripheral portion of the core, an armature core secured to and between the outer portions of said housing members around and contiguous to said field core, said armature core being provided at its inner side with transverse grooves, a pair of sets of armature coils, one set of coils being separate from and positioned inwardly from the other set of coils, a pair of commutators positioned between said field core and said second housing member and supported by said armature core, said commutators being concentric, the engaging faces of said commutators being positioned transversely with the axis of revolution thereof, a brush support mounted on said supporting shaft and provided at the opposite sides of its axis with sets of brush sockets, brushes reciprocally and removably mounted in said brush sockets, said brushes being removably positioned in engagement with said commutators, said second housing being provided in its side wall with openings to permit ready access to said brushes, and cover plates removably mounted over said openings.

11. In a mechanism of the class described, the combination with a power plant having a revoluble member, and a fixed support, of a shaft non-rotatably mounted at its one end on said fixed support and extended with its opposite end into the revoluble member of said power plant, said supporting shaft being hollow from the end mounted on said fixed support, a field core mounted on and intermediate the ends of said supporting shaft, a housing revolubly mounted on said shaft at the outer sides of said field core, an armature carried by said housing around and contiguous to said field core, and electric conductors for said mechanism, said conductors extending through said hollow shaft.

12. In a dynamo electric machine, a revolubly mounted armature, a pair of independent windings on said armature, each winding connected to a vertical commutator, said commutators being disposed in substantially concentric relation on one side of said armature.

13. In a dynamo electric machine, a revolubly mounted armature, a pair of independent windings on said armature, each winding connected to a vertical commutator, said commutators being disposed in substantially concentric relation on one side of said armature and a common supporting means for said commutators, said supporting means being secured to said armature.

14. In a dynamo electric machine, a revolubly mounted armature, a pair of independent windings on said armature, each winding connected to a vertical commutator, said commutators being disposed in axially offset relation on the same side of the armature.

15. In a dynamo electric machine, a revolubly mounted armature, a pair of independent windings on said armature, each winding connected to a vertical commutator, said commutators being disposed in substantially concentric relation on one side of said armature, a common supporting means for said commutator, said supporting means secured to said armature, individual brush mechanism cooperating with said commutators and common means for adjustably supporting said brush mechanism.

In testimony whereof, I have hereunto set my hand at San Diego, California, this 21st day of October, 1926.

EATHELBERT W. WEATHERS.